United States Patent [19]

Kedzierski

[11] Patent Number: 4,617,857

[45] Date of Patent: Oct. 21, 1986

[54] SEALING ARRANGEMENT FOR A LONGITUDINALLY-SLOTTED PRESSURE CYLINDER CLOSED ON THE ENDS

[75] Inventor: Heinrich Kedzierski, Wennigsen, Fed. Rep. of Germany

[73] Assignee: WABCO Westinghouse Steuerungstechnik GmbH, Hanover, Fed. Rep. of Germany

[21] Appl. No.: 661,555

[22] Filed: Oct. 17, 1984

[30] Foreign Application Priority Data

Oct. 21, 1983 [DE] Fed. Rep. of Germany ....... 3338305

[51] Int. Cl.[4] ....................... F01B 29/00; F01B 11/02; F16J 15/18

[52] U.S. Cl. ....................................... 92/88; 92/168; 92/169; 277/DIG. 7

[58] Field of Search .......................... 92/88, 168, 169; 277/DIG. 7

[56] References Cited

U.S. PATENT DOCUMENTS

| | | | |
|---|---|---|---|
| 2,603,190 | 7/1952 | Mitchell | 92/88 |
| 4,057,258 | 11/1977 | Ernst et al. | 277/DIG. 7 X |
| 4,376,543 | 3/1983 | Sakagami | 277/DIG. 7 X |
| 4,481,869 | 11/1984 | Garlapaty | 277/DIG. 7 X |

FOREIGN PATENT DOCUMENTS

| | | | |
|---|---|---|---|
| 69199 | 1/1983 | European Pat. Off. . | |
| 83708 | 8/1971 | German Democratic Rep. . | |
| WO83/02306 | 7/1983 | PCT Int'l Appl. | 92/88 |

*Primary Examiner*—Robert E. Garrett
*Assistant Examiner*—George Kapsalas
*Attorney, Agent, or Firm*—G. E. Hawranko

[57] ABSTRACT

A longitudinally-slotted pressure cylinder, closed on both ends, has a longitudinal slot formed along a substantial portion of the length of the housing, and a piston which is movable within a chamber formed in the housing. A driver member is eccentrically attached to the piston, the driver member having an outer portion extending outward from the slot and an inner portion which is formed substantially to the contour of the inner chamber wall. The driver member attaches to the piston at a point distant from the longitudinal slot. A flexible sealing arrangement is disposed along the longitudinal slot such that, fluid pressure used to move the piston cannot escape through the longitudinal slot as the piston and driver member travel along the slot. The flexible sealing arrangement has a fastening portion connected on the cylinder housing on one side of the slot, an S-shaped sealing portion which extends through the slot, and a flat sealing portion formed at the end of the S-shaped sealing portion within the chamber. The S-shaped sealing portion is prestressed and elastically retains the flat sealing portion against the chamber wall. As the driver member is moved, a bend in the driver member lifts the S-shaped sealing portion off the slot, the bend of the driver member contacting the S-shaped sealing portion to maintain the integrity of the chamber.

16 Claims, 3 Drawing Figures

FIG. 1
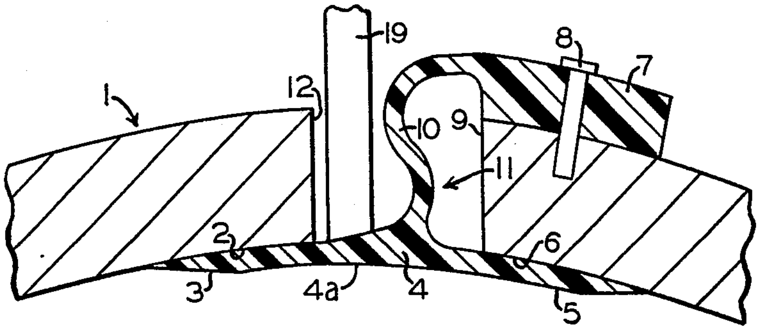
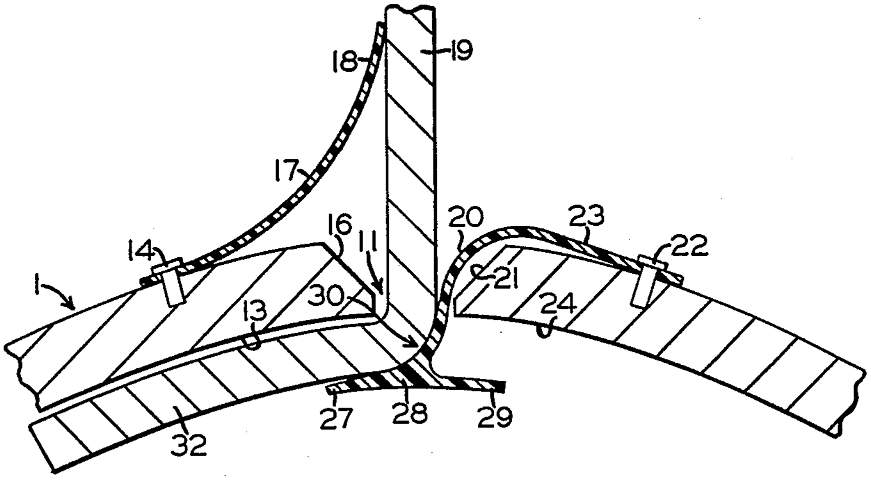
FIG. 2

SEALING ARRANGEMENT FOR A LONGITUDINALLY-SLOTTED PRESSURE CYLINDER CLOSED ON THE ENDS

BACKGROUND OF THE INVENTION

This invention relates to a pressure cylinder which is longitudinally-slotted and sealed on both ends and, more specifically, this invention relates to a construction of such a cylinder wherein there is disposed a movable piston element whose work output is transmitted externally of the pressure cylinder in a radial manner as opposed to a linear manner from one end of the pressure cylinder.

Such rodless piston, or slotted pressure cylinders, as they are known in the industry, can more readily be applied to situations where size constraints render an end extending piston rod, of pressure cylinder arrangement, impractical. Mounting space that would typically be on the order of two times the stroke length can be reduced to the actual cylinder size when using a slotted pressure cylinder. Inherent in the construction of the slotted cylinder is the necessity to seal the bore in which the piston travels at the slot, while still providing external access along the stroke length of the piston. One such approach has been to provide a metallic, spring-acting strip over the slot and a piston with an outer flat portion which is slottedly engaged to the strip such that the piston assembly is guided along this strip. Such a slotted engagement between the piston and metallic seal has resulted in rapid wear of both the metallic strip seal and the piston assembly, and has further exhibited problems of smoothness of the movement of the piston assembly over the metallic strip seal.

Another existing slotted cylinder is disclosed in the European Patent EP-A 1-0069199, which uses a dual-sealing strip arrangement whereby a cover strip bearing on the outside wall of the cylinder is joined by a number of detachable connectors to an inner sealing strip bearing against the inner wall of the cylinder. As the piston and external actuating member travel along the slot, the detachable connectors on one side of the piston are detached and the connectors on the opposite side are joined. In order to guarantee a tight, secure, and removable connection between the cover and seal strips, a relatively expensive and complicated design of the actuator member and the two interlocking strips is necessary. Additionally, due to the constant joining and attaching of the two interlocking sealing strips, there is the undesirable effect of high wear on the components involved.

Still another slotted cylinder, disclosed by East German patent specification No. DD83708, discloses an elastic liner in the cylinder with the ends of the liner overlapping to form a seal at the longitudinal slot. The actuator member is connected to the piston in a nonradial manner, and extends through a slit in the liner and through the longitudinal slot. Such an arrangement has proven costly with regard to installation and maintenance time, and has further proven to be less than completely effective in sealing the cylinder bore.

Additionally, with the two above-mentioned flexible seal arrangements, it is required that the size of the specific seal to be used on a given size pressure cylinder be specifically matched, therefore requiring manufacturers to maintain large inventories of various size sealing elements.

SUMMARY OF THE INVENTION

It is, therefore, an object of the invention to provide a longitudinally-slotted pressure cylinder having a sealing arrangement which is economically efficient in construction, installation, and maintenance operations.

It is a further object of the invention to provide a longitudinally-slotted pressure cylinder having a sealing arrangement which exhibits a minimum amount of wear during operation.

It is yet a further object of the invention to provide a longitudinally-slotted pressure cylinder having a sealing arrangement which, at all times, assures a secure seal for the pressure chamber of the cylinder.

An even further object of the invention is to provide a sealing arrangement for a slotted cylinder which can be applied to a number of pressure cylinders having different cylinder sizes, that is, where the size of the sealing material is substantially independent of the size of the pressure cylinder.

Briefly, the invention consists of a pressure cylinder slotted longitudinally and closed on both ends. A piston, movable within the cylinder under the influence of fluid pressure, has a driver element attached thereto, which extends through the longitudinal slot. A sealing element has a portion which attaches externally to the cylinder on one side of the slot and includes an S-shaped portion, which extends through a portion of the longitudinal slot and into the cylinder. Formed at the end of the S-shaped sealing portion within the cylinder is a flat sealing portion, which is substantially greater in length than the opening space of the longitudinal slot. The side of the flat sealing portion branching from the S-shaped portion can contact the inner cylinder wall on one side, and the driver member on the opposite side. A second sealing element can be secured to the exterior of the cylinder on one side and can flexibly be in contact with the external portion of the driver element on the opposite side.

BRIEF DESCRIPTION OF THE DRAWINGS

FIG. 1 is a cross-sectional view of a portion of a slotted cylinder having a sealing arrangement constructed in accordance with the invention.

FIG. 2 is a cross-sectional view of a portion of a slotted cylinder having a sealing arrangement constructed as an alternative embodiment of the invention.

DESCRIPTION AND OPERATION

Figure 3:
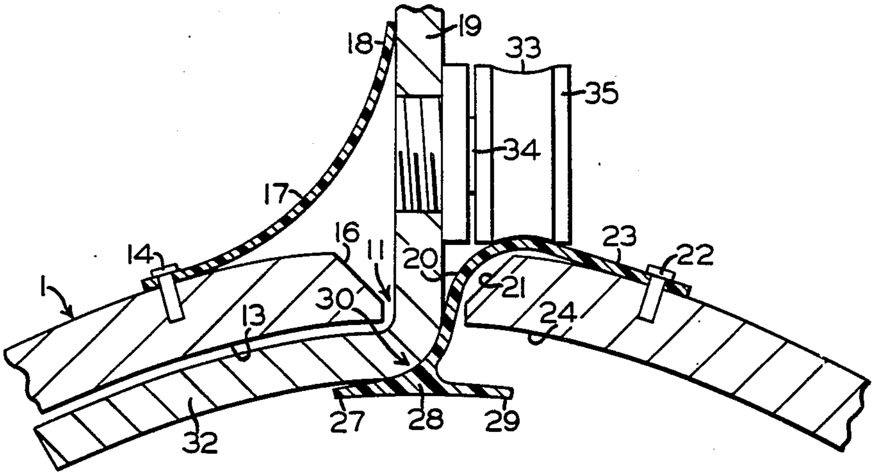
FIG. 3 is a cross-sectional view of a portion of a slotted cylinder having a sealing arrangement constructed in accordance with an alternate embodiment of the invention.

As seen in FIG. 1, a longitudinally-slotted cylinder, closed on both ends, and sealed at the longitudinal slot, consists of a cylinder housing 1 shown only at the cross-sectional portion in the vicinity of the slot, shown generally at 11. Disposed within the cylinder housing 1, is a piston member (not shown), which moves in a guided manner along the longitudinal axis of the cylinder housing 1. A driver element 19 extends through the longitudinal slot 11, formed along the length of the cylinder housing 1 an amount generally equivalent to the piston stroke or the amount of desired travel of the driver element 19.

The longitudinal slot 11 of the cylinder housing 1, formed by the opposing first and second slot edges 9 and 12 of the cylinder housing 1, is sealed off by a first flexible seal strip 4 disposed in the cylinder housing 1, and covering the longitudinal slot 11 on both sides of the piston (not shown). On the first opposing slot edge 9 of the longitudinal slot 11, along the outside of the cylinder housing 1, a fastener seal portion 7 is firmly fastened with the edge of the cylinder housing 1. The symbolically-illustrated clasp 8 extending through the fastener seal element 7 can be a screw, an adhesive connection, or a friction-type connection.

The first flexible seal strip 4 has a flat sealing portion 4*a* disposed in the cylinder housing 1, which flat sealing portion 4*a* has first and second flexible ends 3 and 5 which are in close contact with the opposite surfaces 2 and 6 of the inside wall of the cylinder housing 1. In operation, the cylinder space is pressurized such that, under the influence of the fluid pressure within the cylinder chamber, the first flexible seal strip 4 is pressed against the inner wall of the cylinder housing 1.

To increase the strength of the seal and to prevent the first flexible seal strip 4 from loosening from the inside wall of the cylinder housing 1, when there is no fluid pressure in the cylinder chamber, the first flexible seal strip 4 is connected by an S-shaped spacer portion 10 to the fastener seal element 7. The S-shaped spacer portion 10 connects with the first flexible seal strip 4 at approximately the midpoint, thereby forming essentially a T-shaped joint between the S-shaped spacer portion 10 and the first flexible seal strip 4. The three seal elements 4, 10 and 7 are always designed as long strips, that is, the length of the cylinder housing, and are manufactured such that they form a one-piece part.

The S-shaped spacer portion 10 is prestressed such that, the fastener seal element 7 and the first flexible seal strip 4 enclose the first opposing slot edge 9 of the cylinder housing 1 in the manner of a spring clamp. For this reason, under some circumstances, it is not necessary to secure the first fastener seal 7 to the cylinder housing 1.

The first flexible seal strip 4 is contoured on the side facing the cylinder chamber such that the travel of the piston is not significantly interfered with by the first flexible seal strip 4. As seen in FIG. 1, the seal ends 3 and 5 are tapered toward the cylinder surfaces 2 and 6 to exhibit a smooth transition between the cylinder surfaces 2 and 6 and the seal ends 3 and 5. The material for the seal elements 4, 10 and 7 can be plastic, for example, whereby the S-shaped spacer portion 10 is elastic and prestressed. It is also possible to provide the surface of the first flexible seal strip 4 consisting, for example, of a nonmetallic material on the side facing the cylinder chamber, with a wear-resistant metallic material, specifically a resilient coating. For this purpose, the first flexible seal strip 4 can, for example, advantageously be coated with a thin layer of resilient steel. It is also possible to manufacture all of the parts of the seal elements 4, 10 and 7 of steel strips.

The driver element 19 for the embodiment shown in FIG. 1 will extend out through the longitudinal slot 11, near the second opposing slot edge 12, between the opposing cylinder surface 2 and the flexible seal end portion 3 of the flexible seal strip 4. It can be appreciated that the tension force imparted by the S-shaped seal portion 10 will maintain the flexible seal end portion 3 in a sealing manner against the inner surface of the driver element 19, such that the integrity of the cylinder chamber will be maintained. For the embodiment of FIG. 1, the driver element 19 has moved beyond the point at which the cross-sectional view is taken, therefore the flexible seal end portion 3 has returned to seal against the opposing cylinder surface 2.

As seen in FIG. 2, the longitudinally-slotted cylinder, closed on both ends, has the driver element 19 which connects to the piston (not shown) by means of an inner portion 32, which is structured approximately to the inner contour of the cylinder housing 1 and is in close proximity to the chamber wall. The cylinder housing 1, illustrated in FIG. 2, exhibits with regard to the sealing arrangement for the longitudinal slot 11, a construction similar to that of the cylinder shown in FIG. 1. On the portion of the cylinder housing 1, shown in FIG. 2, a second flexible seal strip 28 for the longitudinal slot 11 is extended inward from the opposing cylinder wall portions 13, 24, whereby the driver element 19 can extend through the longitudinal slot 11.

Formed on opposing sides of the longitudinal slot 16 of the cylinder housing 1 are opposing first and second sloped edges 16, 21. Fastened to the exterior of the cylinder housing 1, on the side of the longitudinal slot 11 having the first sloped edge 21, is a fastener seal portion 23. The schematically-illustrated fastener 22, shown to attach the fastener seal portion 23 to the cylinder housing 1, for example, can be realized by means of a screw, adhesive connection, or a friction-type connection.

Below the longitudinal slot 11 and within the cylinder housing 1, the above-mentioned second seal strip 28 exhibits first and second flexible ends 27, 29 which, when the longitudinal slot 11 is in a sealed condition, are in contact with the corresponding surfaces 13, 24 of the inner wall of the cylinder housing 1. To increase the sealing strength of the second seal strip 28, and to keep the second seal strip 28 from coming loose from the cylinder housing 1 when there is no pressure in the cylinder chamber below it, the second seal strip 28 is connected to the fastener seal portion 23 by means of an S-shaped spacer portion 20. The S-shaped spacer portion 20 engages the second seal strip 28 at approximately the midpoint of the second seal strip 28. The three sealing portions 23, 20 and 28 can be designed to correspond to the elements 7, 10 and 4 of the sealing arrangement shown in FIG. 1. The S-shaped spacer portion 20 is prestressed such that the fastener seal portion 23 and the second seal strip 28, when the longitudinal slot 11 is sealed, surround the first sloped side portion 21 in the manner of a spring clip.

As compared to the condition of the sealing arrangement of FIG. 1, whereby the longitudinal slot 11 is sealed off by the first sealing element 4, FIG. 2 shows a situation in which the second seal strip 28 is moved, by the driver element 19, away from engagement with the inner wall of the cylinder housing 1. The driver element 19 is secured to the piston (not shown) and transmits the movement of the piston and the forces exerted by the piston on the apparatus to be externally driven (not shown). The driver element 19 exhibits a bend 30 inside the cylinder housing 1 such that, in the region of the longitudinal slot 11, it is guided radially outward. In the vicinity of the bend 30, the driver element is in contact with the S-shaped spacer portion 20. Since the cross-sectional view, shown in FIG. 2, is taken from within the piston element (not shown), and the piston has seals (not shown) between the piston faces and the leading and trailing edges of the driver element 19, no fluid pressure is lost through the opening of the second flexible seal element 28 and longitudinal slot 11 forced by the driver element 19. Following passage of the piston over the second flexible seal strip 28 and in order to lift the seal strip 28 by means of the driver element 19, from the inner cylinder housing 1 with as little friction as possible, it is advantageous to design the outer surface of the driver bend 30 as a low-friction element. It is also possible to place a special positive displacement element before and after the seal strip 28 so that the seal strip 28 slides before and after it reaches the driver element 19. This positive displacement element can specifically be designed so that the seal strip 28, at the level of the driver element 19, is essentially deformed and displaced only in a tangential direction.

The S-shaped spacer portion 20 and the second flexible seal strip 28 are designed and prestressed so that the seal ends 27 and 29, as shown, are in contact neither with the inner wall of the cylinder housing 1 nor the driver element 19. In this manner, the above-mentioned seal ends 27 and 29 of the second flexible seal strip 28 are not subjected to wear from the sliding movement of the driver element 19 past the seal ends 27 and 29.

It can be appreciated that the construction of the first and second sloped edges 16, 21 in the sloped manner, accommodate movement of the S-shaped spacer portion 20, displaced by the driver element 19, such that wear between the first sloped edge 21 and the inner portion of the S-shaped spacer portion 20 is kept to a minimum.

The internal region 32 of the driver element 19 can be raised toward the inside of the cylinder housing such that, the driver element 19 can be fastened to the piston (not shown).

To prevent dirt from penetrating the cylinder housing 1 through the longitudinal slot 11, there is a third sealing strip 17 provided, which is fastened by means of a second fastener 14 to the exterior portion of the cylinder housing 1 adjacent the second sloped edge 16. The third seal strip 17 is designed so that it can be raised by the driver element 19 from the longitudinal slot 11, whereby the driver element 19 only contacts the third seal strip 17 at a nonfastened end 18. After the driver element 19 passes the third seal strip 17, the prestressing of the third seal strip 17 allows movement toward the S-shaped spacer portion 20 of the second flexible seal strip 28 such that, the third seal strip 17 contacts the S-shaped spacer portion 20 in an overlapping manner.

FIG. 3 shows a special configuration of the longitudinally-slotted cylinder having the sealing arrangement illustrated in FIG. 2. The same reference numbers for FIG. 2 and FIG. 3 identify the same parts with the same functions. Fastened to the driver element 19, on the side adjacent the S-shaped spacer portion 20, is a shaft 34 on which a wheel 35 is mounted, the wheel 35 being capable of revolving around the shaft 34. The wheel 35 is arranged and sized so that an annular grooved surface 33 contacts the S-shaped spacer portion 20, and thus forces the second flexible seal strip 28 away from the cylinder housing 1 far enough that the driver element 19 can slide past the second flexible seal strip 28 and the S-shaped spacer portion 20 without making contact. In this manner, wear of the driver element 19 and the seal portions 20, 28 is largely prevented.

Although the hereinabove-described forms of embodiments of the invention and the noted alternate embodiments constitute preferred forms, it can be appreciated that other modifications can be made thereto without departing from the scope of the invention as set forth in the appended claims.

I claim:

1. A fluid-pressure-operated, longitudinally-slotted pressure cylinder closed on both ends, comprising:

(a) a cylinder housing having a longitudinal slot formed along at least a portion of the length of said cylinder housing and a chamber formed within said cylinder housing;

(b) a piston member movable within said chamber under the influence of pressurized fluid;

(c) a drive member eccentrically attached to said piston, said driver member having an outer portion extending outward through said longitudinal slot and an inner portion disposed within said chamber and on which said piston attaches; and (d) flexible sealing means disposed over said longitudinal slot for sealing said chamber and preventing pressurized fluid from escaping through said longitudinal slot as said piston and said driver member travel along said longitudinal slot, said flexible sealing means being at least partially attached externally on said cylinder housing on one side of said longitudinal slot, said flexible sealing means having an S-shaped sealing portion extending through said longitudinal slot and a flat sealing portion which seats over a portion of said longitudinal slot and said driver member.

2. A longitudinally-slotted pressure cylinder, as set forth in claim 1, wherein said driver member is substantially L-shaped, with a bend formed between said inner portion and said outer portion of said driver member.

3. A longitudinally-slotted pressure cylinder, as set forth in claim 2, wherein said inner portion of said driver member is formed substantially to the inner contour of said chamber.

4. A longitudinally-slotted pressure cylinder, as set forth in claim 2, wherein said bend of said driver member is substantially rounded.

5. A longitudinally-slotted pressure cylinder, as set forth in claim 4, wherein said S-shaped sealing portion is coated with a resilient metallic coating at least for a portion subject to contact with said bend of said driver member to reduce friction between said bend and said flexible sealing means.

6. A longitudinally-slotted pressure cylinder, as set forth in claim 1, wherein said flat sealing portion extends from said S-shaped sealing portion just within said chamber adjacent said longitudinal slot.

7. A longitudinally-slotted pressure cylinder, as set forth in claim 6, wherein said flat sealing portion and said S-shaped sealing portion are integrally formed and said S-shaped sealing portion extends from said flat sealing portion at approximately the midpoint of said flat sealing portion.

8. A longitudinally-slotted pressure cylinder, as set forth in claim 1, wherein said S-shaped sealing portion is disposed within said longitudinal slot toward a first one of two sides of said cylinder housing which border said longitudinal slot, said driver member being disposed toward a second one of said two sides of said cylinder housing.

9. A longitudinally-slotted pressure cylinder, as set forth in claim 1, wherein said flat sealing portion has a first and a second end configured with an inward taper such that, when said flat sealing portion is seated against said chamber wall, there is an essentially smooth transition between said flat sealing portion and said chamber wall.

10. A longitudinally-slotted pressure cylinder, as set forth in claim 9, wherein said first and second ends of said flat sealing portion are urged away from contact with said driver member as said driver member is moved along said longitudinal slot.

11. A longitudinally-slotted pressure cylinder, as set forth in claim 1, wherein said flexible sealing means includes a fastener sealing portion formed adjacent said S-shaped portion, said flexible sealing means being substantially equal in length to said longitudinal slot, said fastener sealing portion being fastened on the exterior of said cylinder housing adjacent said longitudinal slot.

12. A longitudinally-slotted pressure cylinder, as set forth in claim 11, wherein said fastener sealing portion, said S-shaped sealing portion, and one of said first and second ends of said flat sealing portion are configured to enclose said one side of said cylinder housing at said longitudinal slot in the manner of a spring clip.

13. A longitudinally-slotted pressure cylinder, as set forth in claim 1, wherein said driver member has at least one side having a positive displacement element formed thereon, said positive displacement element moving a portion of said flexible sealing means away from said driver member and said piston, said positive displacement element deforming and displacing said flexible sealing means in a tangential manner.

14. A longitudinally-slotted pressure cylinder, as set forth in claim 1, further comprising a guide roller connected to said outer portion of said driver member, said guide roller contacting said S-shaped sealing portion such that said S-shaped sealing portion is urged out of contact with said driver member.

15. A longitudinally-slotted pressure cylinder, as set forth in claim 14, wherein said guide roller has an annular groove formed along the circumference thereof, said annular groove conforming in shape to said S-shaped sealing portion.

16. A longitudinally-slotted pressure cylinder, as set forth in claim 14, further including a second sealing member disposed on the exterior of said cylinder housing, said second sealing member being attached on a first end to said cylinder housing and contacting said driver member on a second end, said second sealing element contacting said driver member from a second one of said two sides of said cylinder housing which faces the inside bend portion of said driver member.

* * * * *